United States Patent [19]

Kopp et al.

[11] Patent Number: 5,209,211
[45] Date of Patent: May 11, 1993

[54] THROTTLE VALVE CONNECTION PIECE

[75] Inventors: Reiner Kopp, Hirschlanden; Albrecht Baessler, Korntal-Muenchingen; Peter Ropertz, Markgroeningen, all of Fed. Rep. of Germany

[73] Assignee: Robert Bosch GmbH, Stuttgart, Fed. Rep. of Germany

[21] Appl. No.: 902,338

[22] Filed: Jun. 22, 1992

[30] Foreign Application Priority Data

Jul. 4, 1991 [DE] Fed. Rep. of Germany ....... 4122138

[51] Int. Cl.$^5$ .............................................. F02G 5/00
[52] U.S. Cl. .................................... 123/549; 261/142; 261/DIG. 20
[58] Field of Search ................ 123/549, 546; 261/142, 261/DIG. 20

[56] References Cited

U.S. PATENT DOCUMENTS 2,719,519 10/1955 Sutton ........................ 261/DIG. 20
3,916,859 11/1975 Fossum ........................ 261/DIG. 20

FOREIGN PATENT DOCUMENTS 2952375 6/1980 Fed. Rep. of Germany .

*Primary Examiner*—Noah P. Kamen
*Attorney, Agent, or Firm*—Edwin E. Greigg; Ronald E. Greigg

[57] ABSTRACT

Heating devices are used to prevent icing and deposition of fuel on the throttle valve under adverse operating conditions; these device comprise electrical resistance hot wires applied to the surface of the throttle valve, yet these wires lead to undesired turbulence in the fuel-air mixture flow. As the length of time in operation increases, the efficiency of the hot wires is lessened by corrosion of their surface. These disadvantages are avoided by integrating the heating device with the component to be heated. To this end, the heating device is disposed in an axial bore of the throttle valve shaft. This arrangement is used especially with mixture-compressing internal combustion engines equipped with carburetors or central injection systems.

6 Claims, 1 Drawing Sheet

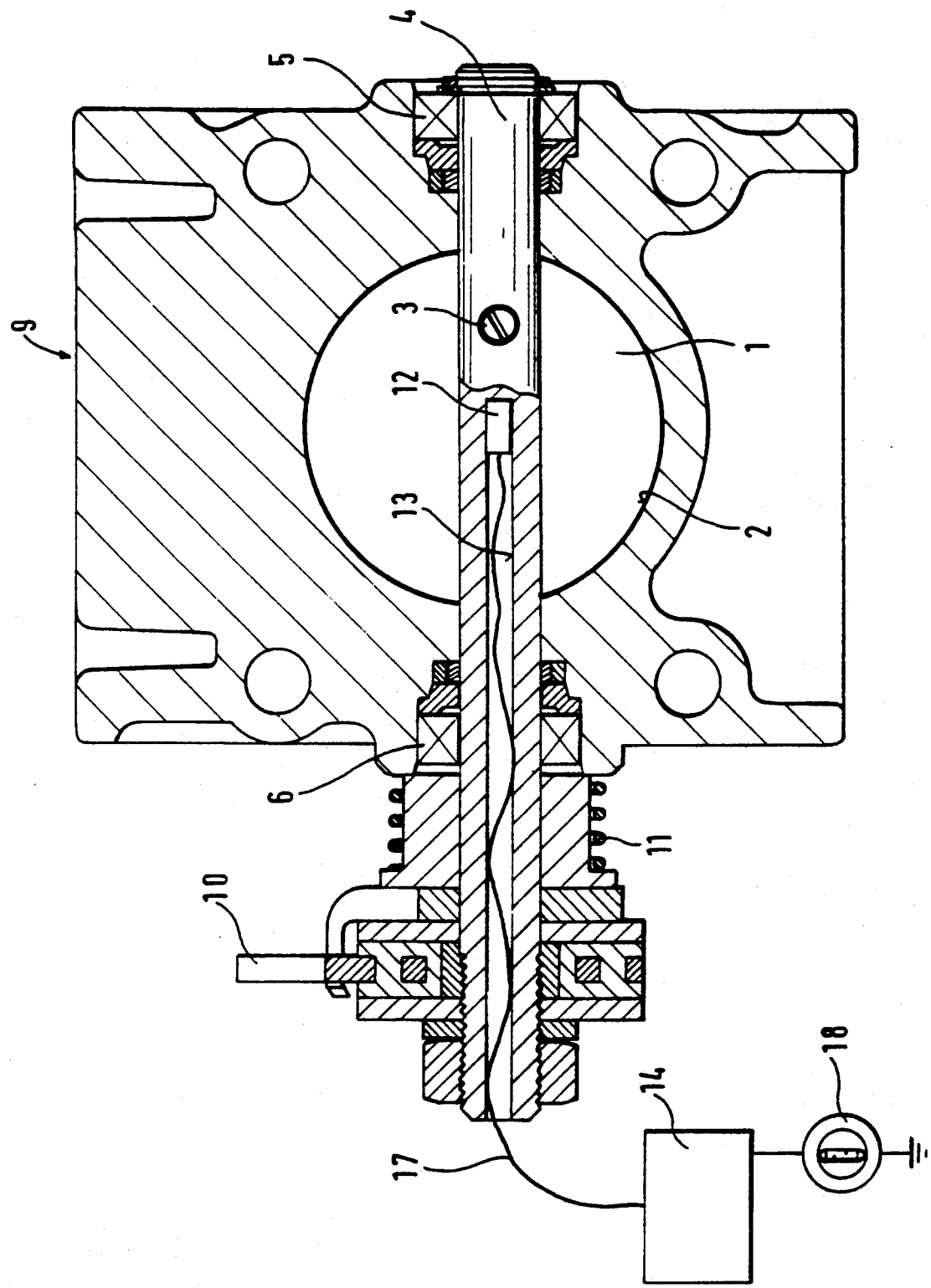

THROTTLE VALVE CONNECTION PIECE

BACKGROUND OF THE INVENTION

The invention is based on a throttle valve connection piece as defined hereinafter. A throttle valve connection piece is already known (German Offenlegungsschrift 29 52 375; U.S. Pat. No. 1,422,896), in which a throttle valve is heated. The heating device is an electrical resistance heater, the hot wires of which are applied to a surface of the throttle valve. This arrangement has the disadvantage of pronounced vulnerability to corrosion of the surface of the hot wire; deposits on the hot wire surface thus make for inadequate heat transfer.

Moreover, the flow of the fuel-air mixture is adversely affected by the hot wires applied to the throttle valve surface. Undesirable turbulence is developed in the mixture as a result.

Furthermore, the power supply to the hot wires, the throttle valve shaft, represents considerable complication in terms of additional components, and assembling these components additionally increases the production cost.

OBJECT AND SUMMARY OF THE INVENTION

The arrangement according to the invention has the advantage over the prior art that the heating device is integrated into the component that is to be heated; this precludes corrosion of the surface of the heater and the resultant insufficiency of the heat transfer. The efficiency remains constant over the entire service life.

Nor is there an adverse effect on the flow of the fuel-air mixture on the part of the heating device. The flow around the throttle valve is virtually unimpeded.

The supply of energy to the heating device can be achieved without major constructional expense.

Further features of and improvements to the throttle valve connection piece disclosed are possible with the provisions revealed herein.

The use of an electrical resistance heater as the heating device, and its placement near the center of the throttle valve, are especially advantageous features.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a simplified view of an exemplary embodiment of the invention.

DESCRIPTION OF THE PREFERRED EMBODIMENT

A throttle valve 1 shown in the drawing controls an intake conduit 2 of an internal combustion engine, not otherwise shown in detail. The throttle valve 1 is fixed to a throttle valve shaft 4 by means of at least one fastener 3, such as a screw; the shaft 4 is supported in a throttle valve connection piece 9 by means of bearings 5 and 6. The actuation of the throttle valve shaft 4 is effected via an articulation lever 10, counter to a restoring spring 11. A heating device 12 is disposed in an axial bore 13 of the throttle valve shaft 4, as close as possible to the throttle valve 1. By way of example, an electrical resistance heater or heating ceramic is used as the heating device 12. The power supply to the heating device 12 is assured by means of a known regulating circuit in an electronic control unit 14, which is connected to the heating device 12 by a conductor 17. The control unit 14 is connected to a current circuit by an ignition lock 18.

Heating of the throttle valve 1 and throttle valve shaft 4 is accomplished according to the invention by the heating device 12; the heat reaches the throttle valve shaft 4 and the throttle valve 1 by conduction and radiation. Because the heating device 12 is located as centrally as possible, and because of the low thermal capacity of the components to be heated, fast, uniform heating of the throttle valve shaft 4 and throttle valve 1 is attained.

The demand for low fuel consumption, high power and minimization of the residues from combustion can be met only if the largest possible proportion of the fuel reaches the combustion chambers of the cylinders of an internal combustion engine in finely atomized form. Adverse operating conditions, particularly in cold climates such as a low ambient temperature and high humidity, can lead to icing and the deposit of fuel in liquid form on the surface of the throttle valve 1, if the throttle valve is disposed downstream of the device that meters the fuel. As a result, the above disposition is a particularly severe threat to carburetors and central injection systems of mixture-compressing internal combustion engines with externally supplied ignition. An improvement in these conditions is attained by using the throttle valve heater according to the invention.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle valve connection piece for mixture-compressing internal combustion engines with externally supplied ignition, having an intake conduit and a throttle valve located in and controlling said conduit, said throttle valve being secured to a throttle valve shaft, said throttle valve being adapted to be heated by means of an electrical heating device, with said electrical heating device (12) being disposed in an axial bore (13) of the throttle valve shaft (4).

2. A throttle valve connection piece as defined by claim 1, in which the electrical heating device (12) terminates as close as possible to the center of the throttle valve (1).

3. A throttle valve connection piece as defined by claim 1, in which an electric resistance heater is used as the heating device (12).

4. A throttle valve connection piece as defined in claim 1 in which said axial bore is a blind bore and extends along said shaft to the center of said throttle and said electrical heating element is fixed in the shaft at the mid-point of said throttle valve.

5. A throttle valve connection piece as defined in claim 2 in which said axial bore is a blind bore and extends along said shaft to the center of said throttle and said electrical heating element is fixed in the shaft at the mid-point of said throttle valve.

6. A throttle valve connection piece as defined in claim 3 in which said axial bore is a blind bore and extends along said shaft to the center of said throttle and said electrical heating element is fixed in the shaft at the mid-point of said throttle valve.

* * * * *